(12) United States Patent
Ramarao

(10) Patent No.: US 9,317,685 B1
(45) Date of Patent: Apr. 19, 2016

(54) METHOD AND SYSTEM FOR ACCESS REQUEST ALERTS FOR PROTECTED INFORMATION

(71) Applicant: EMC Corporation, Hopkinton, MA (US)

(72) Inventor: Shreenidhi Ramarao, Bangalore (IN)

(73) Assignee: EMC CORPORATION, Hopkinton, MA (US)

( * ) Notice: Subject to any disclaimer, the term of this patent is extended or adjusted under 35 U.S.C. 154(b) by 0 days.

(21) Appl. No.: 13/926,194

(22) Filed: Jun. 25, 2013

(51) Int. Cl.
*G06F 7/04* (2006.01)
*G06F 21/00* (2013.01)
*G06F 21/55* (2013.01)

(52) U.S. Cl.
CPC .................................. *G06F 21/552* (2013.01)

(58) Field of Classification Search
CPC ........ G06G 21/552; G06F 21/31; G06F 21/10
USPC ............................................ 726/27; 713/182
See application file for complete search history.

(56) References Cited

U.S. PATENT DOCUMENTS

| | | | |
|---|---|---|---|
| 2002/0049899 A1* | 4/2002 | Kenworthy | 713/1 |
| 2004/0019807 A1* | 1/2004 | Freund | 713/201 |
| 2011/0038483 A1* | 2/2011 | Goeller et al. | 380/282 |
| 2012/0134348 A1* | 5/2012 | Kim | 370/338 |
| 2012/0185921 A1* | 7/2012 | Wechsler et al. | 726/4 |
| 2014/0004826 A1* | 1/2014 | Addy et al. | 455/411 |

* cited by examiner

*Primary Examiner* — Teshome Hailu
(74) *Attorney, Agent, or Firm* — Dergosits & Noah LLP; Todd A. Noah

(57) ABSTRACT

Access request alerts for protected information is described. A request is received, from an access requestor, to access protected information. Identifying data associated with the access requestor is determined. An access request alert is sent to a computer associated with protecting the protected information, wherein the access request alert includes the identifying data and an indication whether a list of authorized users comprises the access requestor. Receiving subsequent access request alerts associated with the access requestor may be disabled while maintaining the capability to receive subsequent access request alerts associated with another access requestor. Access by the access requestor may be enabled to the protected information in response to an indication that the list of authorized users does not comprise the access requestor. A report of access requests may be generated that enable identification of persistent threats of unauthorized access to the protected information.

20 Claims, 3 Drawing Sheets

METHOD AND SYSTEM FOR ACCESS REQUEST ALERTS FOR PROTECTED INFORMATION

BACKGROUND

Information rights management protects sensitive information from unauthorized access. Information rights management systems are typically used to protect information such as documents and emails in a business to business model, such as financial data, intellectual property, and executive communications. Information can be protected from unauthorized users by selectively preventing the use of access rights such as read, write, copy & paste, print, and screen shot. Access to protected information can continue to be controlled even after the protected information is distributed. Instead of limiting the ability for protected information to be shared, access rules are enforced when potential users attempt to gain access to the protected information. Therefore, a protected document can be distributed in an environment where the document's recipients could not necessarily be trusted. If a protected email is accidentally forwarded to users that include unauthorized users, only the authorized users could gain access to the protected email. Often people share protected information with potential users who should legitimately have access to the protected information, but do not yet have access to the protected information. Therefore, information rights management systems convey the access requests to the creator or the protector of the protected information. The creator or the protector of the protected information can dynamically modify the access rights to protected information by authorized users, or by unauthorized users, for protected information that has already been distributed.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

A hacker may repeatedly attempt to access protected information until the hacker is eventually successful at unauthorized access to the protected information. While an organization may be able to take effective measures to address such a persistent threat before the hacker is eventually successful, often an organization may be unaware of such a persistent threat until after the hacker is successful.

Embodiments herein provide access request alerts for protected information. A request is received, from an access requestor, to access protected information. For example, an alert tool receives a request from a computer to decrypt a document containing a newly invented pharmaceutical formula. Identifying data associated with the access requestor is determined. For example, the alert tool identifies the request to decrypt the document as coming from a computer with an internet protocol address for Acme Corporation and a log-in identifier provided to a specific employee who works for Acme Corporation. An access request alert is sent to a computer associated with protecting the protected information, wherein the access request alert includes the identifying data and an indication whether a list of authorized users includes the access requestor. For example, the alert tool sends an access request alert to the mobile phone of the creator of the pharmaceutical formula document, identifying the requestor as a specific Acme Corporation employee and specifying whether this employee is on the authorized users list for decrypting the pharmaceutical formula document. The alert tool can notify an organization of a hacker's repeated attempts to gain unauthorized access to protected information, thereby enabling the organization to take effective measures to address such a persistent threat before the hacker is eventually successful at gaining unauthorized access to the protected information.

Figure 1:
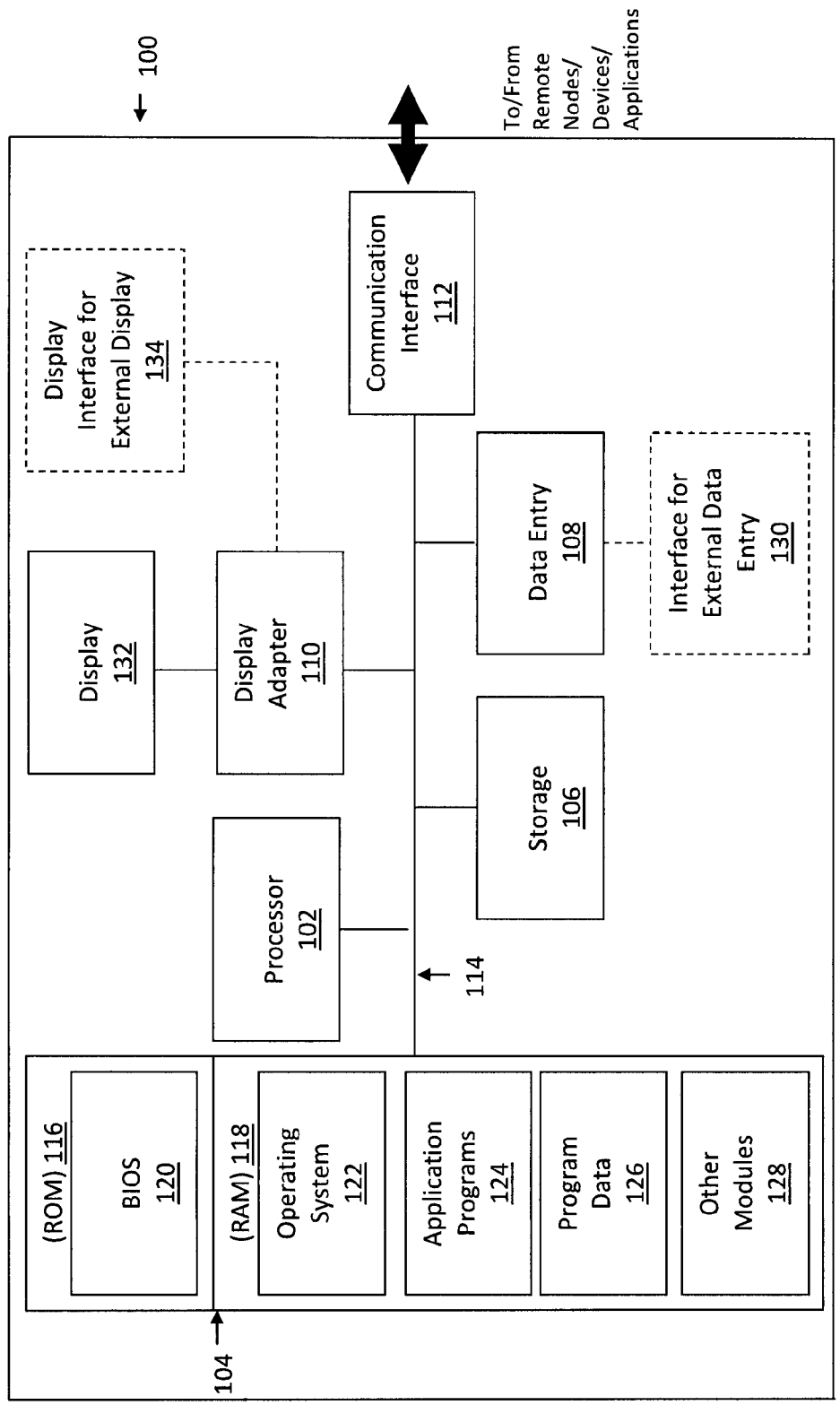
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for access request alerts for protected information.

A hacker may repeatedly attempt to access protected information until the hacker is eventually successful at unauthorized access to the protected information. While an organization may be able to take effective measures to address such a persistent threat before the hacker is eventually successful, often an organization may be unaware of such a persistent threat until after the hacker is successful. Embodiments herein provide access request alerts for protected information. An alert tool can notify an organization of a hacker's repeated attempts to gain unauthorized access to protected information, thereby enabling the organization to take effective measures to address such a persistent threat before the hacker is eventually successful at gaining unauthorized access to the protected information.

Figure 2:
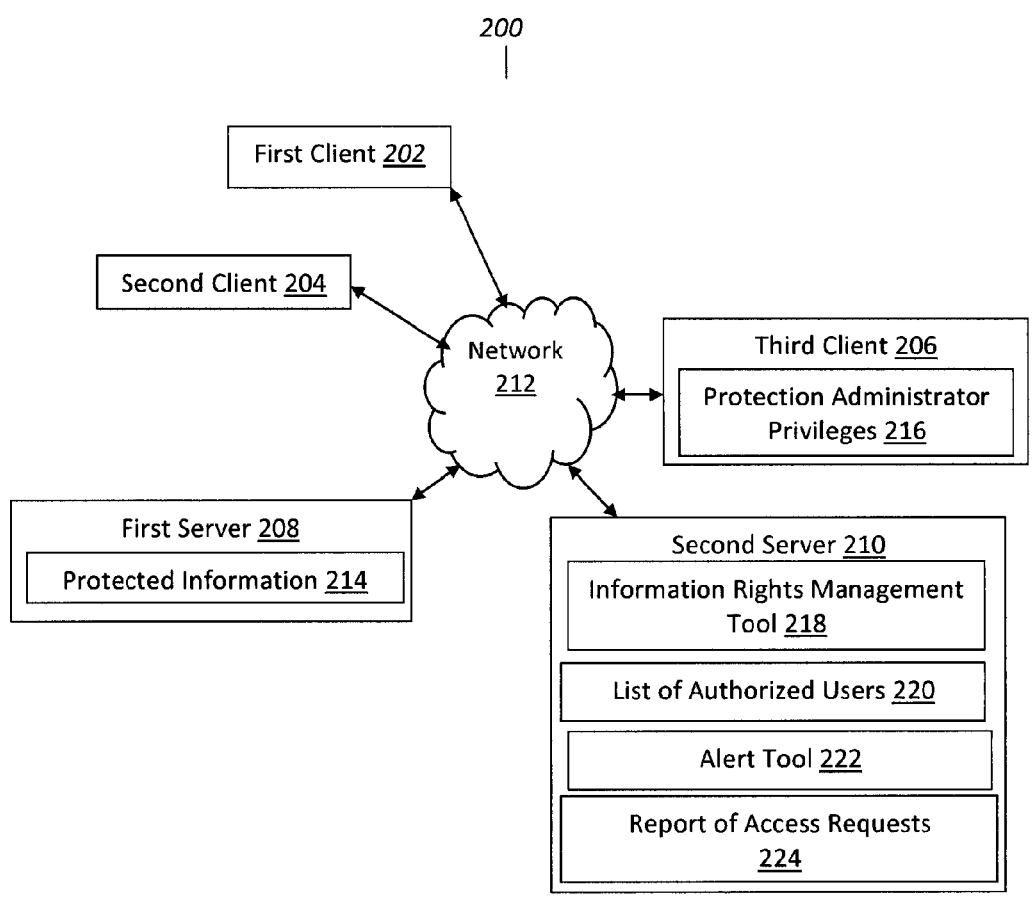
FIG. 2 illustrates a block diagram of an example system for access request alerts for protected information, under an embodiment.

FIG. 2 illustrates a block diagram of a system that provides access request alerts for protected information, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202, a second client 204, and a third client 206; and a first server 208 and a second server 210 that are provided by a hosting company. The clients 202-206 and the servers 208-210 communicate via a network 212. Although FIG. 2 depicts the system 200 with three clients 202-206, two servers 208-210, and one network 212, the system 200 may include any number of clients 202-206, servers 208-210, and networks 212. The clients 202-206 and the servers 208-210 may each be substantially similar to the system 100 depicted in FIG. 1.

The first client 202 enables an authorized user to access protected information 214 stored by the first server 208. Although the protected information 214 may be an email, the protected information 214 may be referred to as the pharmaceutical formula document 214. Although FIG. 2 depicts the protected information 214 as stored by the first server 208, the protected information 214 may be stored anywhere in the system 200. The second client 204 enables an unauthorized user to request access to the protected information 214. The third client 206 includes protection administrator level privileges 220 that enable an administrator to respond to access request alerts by granting authorized users more access to the protected information 214 and by granting unauthorized users any level of access to the protected information 214. Such an administrator may be the creator of the protected information 214 or somebody assigned to monitor and/or approve requests to the protected information 214. The third client 206 may be referred to as the mobile phone 206.

The second server 210 includes an information rights management tool 226 that manages information rights associated with the protected information 214, a list of authorized users 220 that specifies which users have which access rights to the protected information 214, and an alert tool 222 that provides access request alerts when a request is received to access the protected information 214 and generates a report of access requests that summarizes the requests to access the protected information 214 over time. FIG. 2 depicts the system elements 218-224 residing completely on the second server 210. However, the system elements 218-224 may reside in any combination of partially on the first server 208, partially on the second server 210, and partially on other servers that are not depicted in FIG. 2.

An alert tool receives a request from an access requestor to access protected information. For example, the alert tool 222 receives a request from the first client 202 to decrypt the pharmaceutical formula document 214, with the information rights management tool 218 forwarding the request from the first client 202 to the alert tool 222. The information rights management tool 218 may require that an access requestor have access plug-in software before accessing the protected information 214. For example, an authorized user requests to access the protected information 214 via the first client 202, but the information rights management tool 218 detects that the first client 202 lack the access plug-in software. Therefore, the information rights management tool 218 prompts the first client 202 to download the access plug-in software. After the first client 202 downloads the access plug-in software, the authorized user requests access to the protected information 214, and the information rights management tool 218 checks the list of authorized users 220 to determine if the access requestor using the first client 202 to request access to the protected information 214 has the authority for the requested access to the protected information 214.

An alert tool determines identifying data associated with an access requestor. For example, the alert tool 222 identifies the request to decrypt the pharmaceutical formula document 214 as coming from the first client 202, with an internet protocol address for Acme Corporation, a log-in identifier provided to a specific employee who works for Acme Corporation, an email address for the specific employee who works for Acme Corporation, and a global positioning system location associated with Acme Corporation's headquarters.

An alert tools sends an access request alert to a computer associated with protecting protected information, wherein the access request alert includes identifying data and an indication whether a list of authorized users includes the access requestor. For example, the alert tool 222 sends an access request alert to the mobile phone 206 of the creator of the pharmaceutical formula document 214, identifying the decryption requestor as a specific Acme Corporation employee and specifying that this employee is on the list of authorized users 220 for decrypting the pharmaceutical formula document 214. In another example, the alert tool 222 sends an access request alert to the mobile phone 206 of the creator of the pharmaceutical formula document 214, identifying the decryption requestor with an internet protocol for a competitor of Acme Corporation and specifying that this requestor is not on the list of authorized users 220 for decrypting the pharmaceutical formula document 214.

An alert tool may disable receiving subsequent access request alerts associated with an authorized user while maintaining the capability to receive subsequent access request alerts associated with another access requestor. For example, the creator of the pharmaceutical formula document 214 instructs the alert tool 222 to send no more access request alerts to the creator's mobile phone 206 whenever a specific Acme Corporation employee requests to decrypt the pharmaceutical formula document 214 during the next 24 hours. However, the alert tool 222 will continue to send access request alerts to the creator's mobile phone 206 whenever the specific Acme Corporation employee requests other types of access to the pharmaceutical formula document 214 which are unauthorized for this employee, such as cut and paste or whenever other access requestors request access to the pharmaceutical formula document 214. In another example, the creator of the pharmaceutical formula document 214 instructs the alert tool 222 to send no more access request alerts to the creator's mobile phone 206 for the next four requests by the specific Acme Corporation employee to decrypt the pharmaceutical formula document 214. The duration for disabling specific alert types for a specific requestor and the number of request types that do not result in the generation of an access request alert for a specific requestor are both configurable.

An alert tool may enable access by an access requestor to protected information in response to an indication that a list of authorized users does not include the access requestor. For example, the creator of the pharmaceutical formula document 214 instructs the alert tool 222 to instruct the information rights management tool 218 to provide additional copy & paste capabilities for the pharmaceutical formula document 214 to the Acme Corporation employee during the next 8 hours. In another example, the creator of the pharmaceutical formula document 214 instructs the alert tool 222 to instruct the information rights management tool 218 to add the unauthorized user using the second client 204 to the list of authorized users 220 to decrypt for the pharmaceutical formula document 214 on a single occasion. The duration for enabling specific access types for a specific requestor and the number of times that a specific access type is enabled for a specific requestor are both configurable.

An alert tool may generate a report of access requests that enable identification of persistent threats of unauthorized access to protected information. For example, the alert tool 222 sends the report of access requests 224 for the pharmaceutical formula document 214 during the last week to the creator's mobile phone 206, and the report of access requests 224 identifies dozens of access requests made by an unauthorized requestor with an internet protocol address for a competitor of Acme Corporation. The duration for the report of access requests 224 is configurable. The alert tool 222 can notify an organization of a hacker's repeated attempts to gain unauthorized access to the protected information 214, thereby enabling the organization to take effective measures to address such a persistent threat before the hacker is eventually successful at gaining unauthorized access to the protected information 214.

Figure 3:
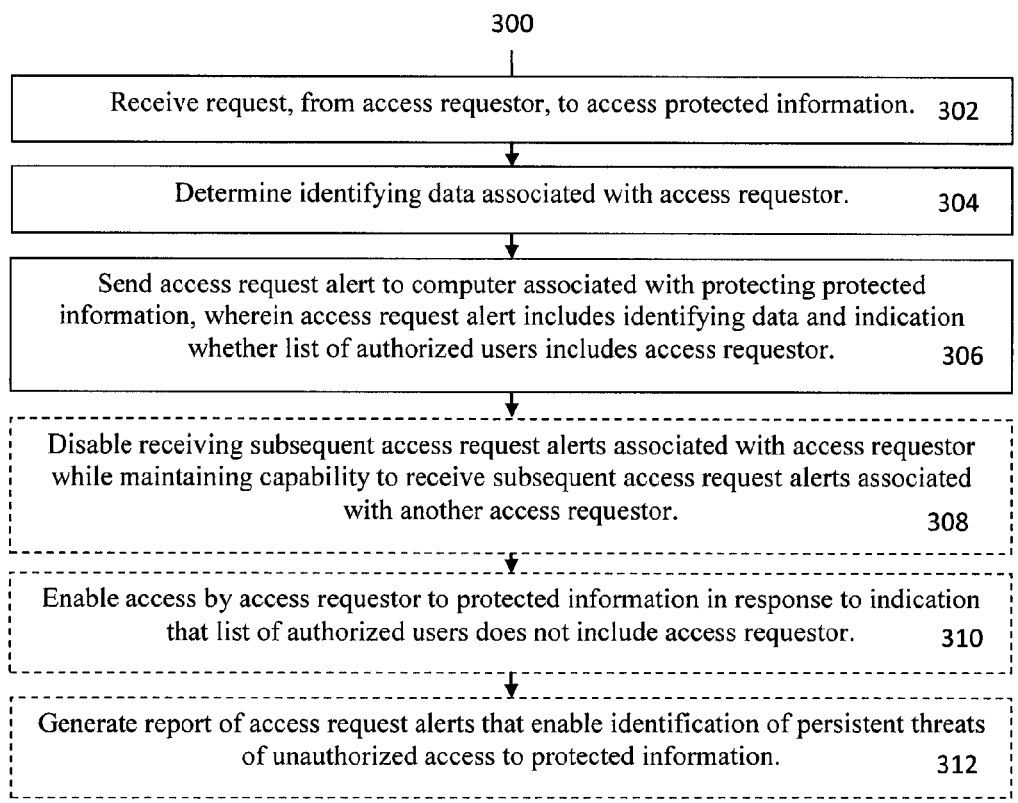
FIG. 3 is a flowchart that illustrates a method of access request alerts for protected information, under an embodiment.

FIG. 3 is a flowchart that illustrates a method of access request alerts for protected information. Flowchart 300 illustrates method acts illustrated as flowchart blocks for certain steps involved in and/or between the clients 202-206 and/or the servers 208-210 of FIG. 2.

A request is received, from an access requestor, to access protected information, act 302. For example, the alert tool 222 receives a request from the first client 202 to decrypt the pharmaceutical formula document 214.

Identifying data associated with an access requestor is determined, act 304. For example, the alert tool 222 identifies a request to decrypt the pharmaceutical formula document 214 as coming from the first client 202, with an internet protocol address for Acme Corporation and a log-in identifier provided to a specific employee who works for Acme Corporation.

An access request alert is sent to a computer associated with protecting protected information, wherein the access request alert includes identifying data and an indication whether a list of authorized users includes the access requestor, act 306. For example, the alert tool 222 sends an access request alert to the mobile phone 206 of the creator of the pharmaceutical formula document 214, identifying a requestor as an Acme Corporation employee and specifying that this employee is on the list of authorized users 220 for decrypting the pharmaceutical formula document 214.

Receiving subsequent access request alerts associated with an authorized user is optionally disabled while maintaining the capability to receive subsequent access request alerts associated with another access requestor, act 308. For example, the creator of the pharmaceutical formula document 214 instructs the alert tool 222 to send no more access request alerts to the creator's mobile phone 206 whenever a specific Acme Corporation employee requests to decrypt the pharmaceutical formula document 214 during the next 24 hours.

Access by an access requestor is optionally enabled to protected information in response to an indication that a list of authorized users does not include the access requestor, act 310. For example, the creator of the pharmaceutical formula document 214 instructs the alert tool 222 to provide additional copy & paste capabilities for the pharmaceutical formula document 214 to an Acme Corporation employee during the next 8 hours.

A report of access requests may be generated that enable identification of persistent threats of unauthorized access to protected information, act 312. For example, the alert tool 222 sends the report of access requests 224 for the pharmaceutical formula document 214 during the last week to the creator's mobile phone 206.

Although FIG. 3 depicts the acts 302-312 occurring in a specific order, the acts 302-312 may occur in another order. Executing the flowchart 300 provides access request alerts for protected information. The alert tool 222 can notify an organization of a hacker's repeated attempts to gain unauthorized access to the protected information 214, thereby enabling the organization to take effective measures to address such a persistent threat before the hacker is eventually successful at gaining unauthorized access to the protected information 214

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for access request alerts for protected information, the system comprising:
a processor-based application, which when executed on a computer, will cause the processor to:
receive, by an information rights management tool, a request to access protected information from an access requestor;
check, by the information rights management tool, the access requestor against a list of authorized users to determine whether the access requestor is on the list of authorized users;
determine, by an alert tool, identifying data associated with the access requestor; and
send, by the alert tool, an access request alert to a computer associated with protecting the protected information, wherein the access request alert comprises the identifying data associated with the access requestor and an indication whether the access requestor is included in the list of authorized users based upon the determination by the information rights management tool, and wherein the identifying data associated with the access requestor enables a determination whether to grant access to the access requestor when the access requestor is determined to not be on the list of authorized users.

2. The system of claim 1, wherein the protected information comprises at least one of a document and an email that is encrypted.

3. The system of claim 1, wherein the identifying data comprises at least one of an internet protocol address, an email address, a log-in identifier, and a geographic location.

4. The system of claim 1, wherein the processor-based application, when executed, will further cause the processor to disable receiving subsequent access request alerts associated with the access requestor while maintaining a capability to receive subsequent access request alerts associated with another access requestor.

5. The system of claim 1, wherein the processor-based application, when executed, will further cause the processor to receive a user input from an authorized user to enable access by the access requestor to the protected information in response to an indication that the list of authorized users does not comprise the access requestor.

6. The system of claim 1, wherein the processor-based application, when executed, will further cause the processor to generate a report of access requests that enable identification of persistent threats of unauthorized access to the protected information.

7. The system of claim 1, wherein the requested access to the protected information comprises at least one of decryption, read, write, copy & paste, print, and screen shot.

8. A computer-implemented method for access request alerts for protected information, the method comprising:
receiving, by an information rights management tool operating on a server, a request to access protected information from an access requestor;
checking, by the information rights management tool, the access requestor against a list of authorized users to determine whether the access requestor is on the list of authorized users;
determining, by an alert tool operating on the server, identifying data associated with the access requestor; and
sending, from the alert tool operating on the server, an access request alert to a computer associated with protecting the protected information, wherein the access request alert comprises the identifying data associated with the access requestor and an indication whether the access requestor is included in the list of authorized users based upon the determination by the information rights management tool, and wherein the identifying data associated with the access requestor enables a determination whether to grant access to the access requestor when the access requestor is determined to not be on the list of authorized users.

9. The method of claim 8, wherein the protected information comprises at least one of a document and an email that is encrypted.

10. The method of claim 8, wherein the identifying data comprises at least one of an internet protocol address, an email address, a log-in identifier, and a geographic location.

11. The method of claim 8, wherein the method further comprises disabling receiving subsequent access request alerts associated with the access requestor while maintaining a capability to receive subsequent access request alerts associated with another access requestor.

12. The method of claim 8, wherein the method further comprises receiving a user input from an authorized user to enable access by the access requestor to the protected information in response to an indication that the list of authorized users does not comprise the access requestor.

13. The method of claim 8, wherein the method further comprises generating a report of access requests that enable identification of persistent threats of unauthorized access to the protected information.

14. The method of claim 8, wherein the requested access to the protected information comprises at least one of decryption, read, write, copy & paste, print, and screen shot.

15. A computer program product, comprising a non-transitory computer-readable medium having a computer-readable program code embodied therein, the computer-readable program code adapted to be executed by one or more processors to:
receive, by an information rights management tool, a request to access protected information from an access requestor;
check, by the information rights management tool, the access requestor against a list of authorized users to determine whether the access requestor is on the list of authorized users;
determine identifying data associated with the access requestor; and
determine, by an alert tool, identifying data associated with the access requestor; and
send, by the alert tool, an access request alert to a computer associated with protecting the protected information, wherein the access request alert comprises the identifying data associated with the access requestor and an indication whether the access requestor is included in the list of authorized users based upon the determination by the information rights management tool, and wherein the identifying data associated with the access requestor enables a determination whether to grant access to the access requestor when the access requestor is determined to not be on the list of authorized users.

16. The computer program product of claim 15, wherein the protected information comprises at least one of a document and an email that is encrypted.

17. The computer program product of claim 15, wherein the identifying data comprises at least one of an internet protocol address, an email address, a log-in identifier, and a geographic location.

18. The computer program product of claim 15, wherein the computer-readable program code is further adapted to be executed by the one or more processors to disable receiving subsequent access request alerts associated with the access requestor while maintaining a capability to receive subsequent access request alerts associated with another access requestor.

19. The computer program product of claim 15, wherein the computer-readable program code is further adapted to be executed by the one or more processors to receive a user input from an authorized user to enable access by the access requestor to the protected information in response to an indication that the list of authorized users does not comprise the access requestor.

20. The computer program product of claim 15, wherein the computer-readable program code is further adapted to be executed by the one or more processors to generate a report of access requests that enable identification of persistent threats of unauthorized access to the protected information.

* * * * *